(12) United States Patent
Kapre et al.

(10) Patent No.: US 11,449,520 B1
(45) Date of Patent: Sep. 20, 2022

(54) PARALLEL FETCHING OF QUERY RESULT DATA

(71) Applicant: Snowflake Inc., Bozeman, MT (US)

(72) Inventors: Harsha S. Kapre, San Mateo, CA (US); Mark T. Keller, San Mateo, CA (US); Srinath Shankar, Belmont, CA (US); Kushan A. Zaveri, North York (CA)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/501,992

(22) Filed: Oct. 14, 2021

(51) Int. Cl.
G06F 16/2458 (2019.01)

(52) U.S. Cl.
CPC .............................. G06F 16/2471 (2019.01)

(58) Field of Classification Search
CPC .................................................. G06F 16/2471
See application file for complete search history.

(56) References Cited

U.S. PATENT DOCUMENTS

| | | | |
|---|---|---|---|
| 8,312,037 B1 | 11/2012 | Bacthavachalu et al. | |
| 9,218,354 B2 | 12/2015 | Lang et al. | |
| 11,188,593 B1 * | 11/2021 | Hale | G06F 16/252 |
| 2009/0204593 A1 * | 8/2009 | Bigby | G06F 16/27 |
| 2014/0114994 A1 | 4/2014 | Lindblad et al. | |
| 2017/0177411 A1 * | 6/2017 | Thomas | G06F 9/5066 |
| 2019/0340179 A1 * | 11/2019 | Konik | G06F 16/24554 |
| 2020/0226156 A1 | 7/2020 | Borra et al. | |
| 2020/0233661 A1 * | 7/2020 | Grosse | G06F 8/45 |
| 2020/0242118 A1 * | 7/2020 | Dageville | H04L 67/1097 |
| 2021/0397611 A1 * | 12/2021 | Boutros | G06F 21/6218 |

OTHER PUBLICATIONS

"U.S. Appl. No. 17/453,756, Non Final Office Action dated Feb. 11, 2022", 18 pgs.

* cited by examiner

*Primary Examiner* — Dangelino N Gortayo
(74) *Attorney, Agent, or Firm* — Schwegman Lundberg & Woessner, P.A.

(57) ABSTRACT

Provided herein are systems and methods for query result data processing, including parallel fetching and processing of query result data. A system includes at least one hardware processor coupled to memory and configured to obtain query result information associated with query result data. Multiple result batches are generated based on the query result information. Each result batch of the multiple result batches includes location information and schema information associated with a portion of the query result data. A data processing request corresponding to the result batch is detected. The portion of the query result data associated with the result batch is retrieved in response to the data processing request. The retrieving uses the location information within the result batch. The portion of the query result data is parsed using the schema information, to generate parsed result data.

27 Claims, 9 Drawing Sheets

PARALLEL FETCHING OF QUERY RESULT DATA

TECHNICAL FIELD

Embodiments of the disclosure relate generally to databases and, more specifically, to parallel fetching of query result data (e.g., query result data generated by cloud services of a database system).

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
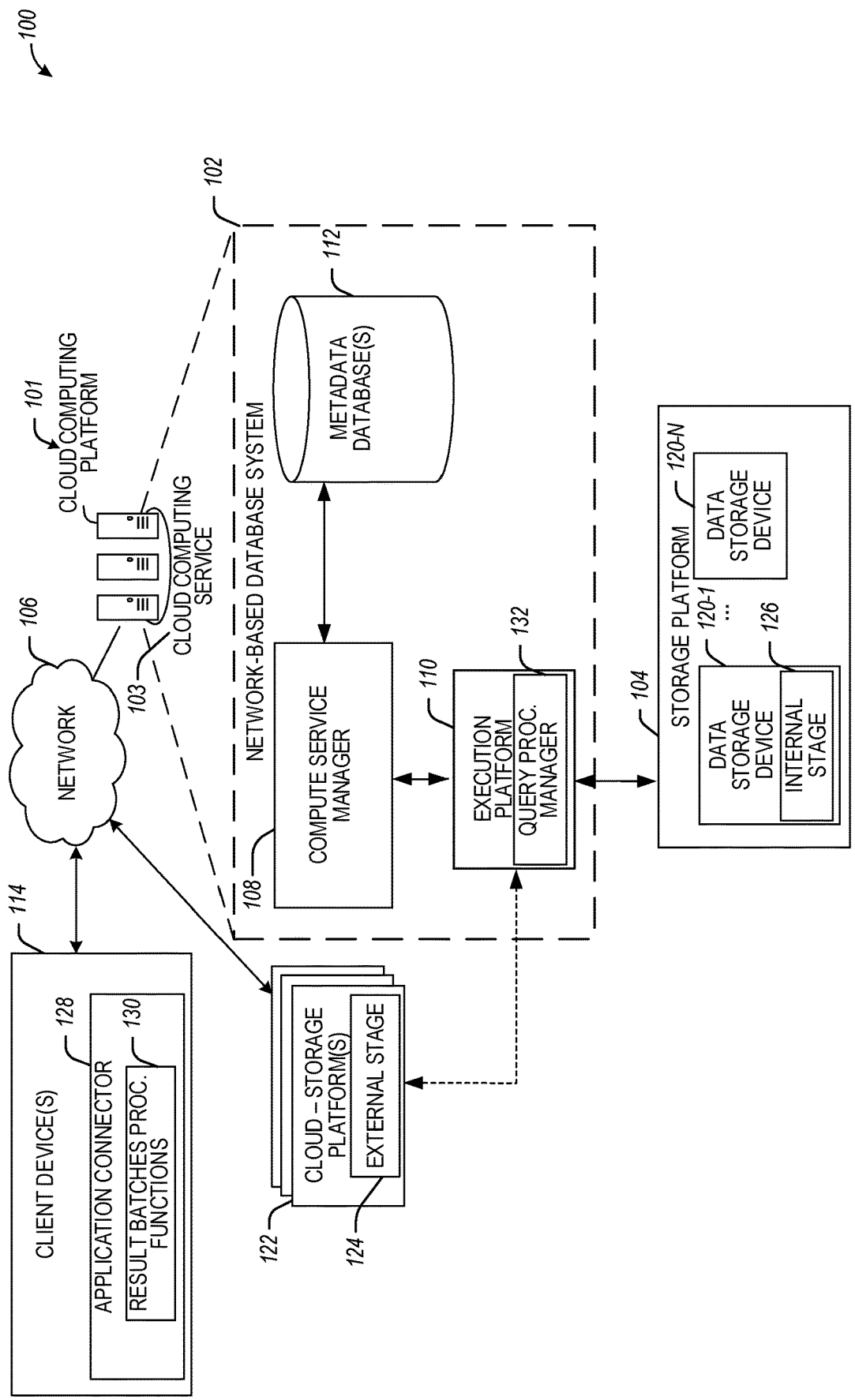
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Aspects of the present disclosure provide techniques for the distribution of query results to different processing nodes (or multiple threads executing on one or more processing nodes) without the significant computational overhead. Additionally, the disclosed techniques may be used to configure distributed workload processing in distributed computing scenarios, including parallel fetching and parsing of result data.

Some existing techniques for result data processing include downloading and materializing the results on a single computing node. The results are then partitioned, and each result chunk (or result partition) is transferred to another node or computing process. Other techniques for result data processing include executing a "select from result_scan" command from each of the computer processes that require some part of the results, and download the data that a computer process deemed necessary with all the results before it. These result data processing techniques, however, are time and resource-intensive and may cause processing inefficiencies.

In comparison, the disclosed techniques use result batches for processing result data more efficiently, without the need for fetching and distributing result data before parsing. As used herein, the term "result batch" indicates a data structure that encapsulates a function (also referred to herein as "result data retrieval function" or "retrieval function") that may be used for fetching query result data (e.g., a subset of query result data generated after a query execution, also referred to herein as a "query result subset"). In some embodiments, a result batch encapsulates a function that includes location information (e.g., storage location information or a uniform resource locator (URL) information) identifying the location where the result data is stored, authentication information for accessing the stored result data, and a schema (which may be used for parsing or transforming the result data after it is retrieved from the storage location). In some aspects, the encapsulated function may further include other metadata information such as the stored result data size or other metadata information. Each result batch may be used for fetching and parsing the results that it holds, and the result batch has only one dependency to achieve this, which is the application connector that is used for executing the queries.

In some embodiments, result batches are generated when result data is available after a query is executed. Since each of the result batches are "lightweight" (e.g., only include minimal information such as the above-described retrieval function information without actual result data), the result batches can be communicated/transferred to computing nodes or process threads independently of other result batches, and workload distribution and parallel processing of result data can be achieved in time- and resource-efficient manner (e.g., without the need for separate downloading and transferring of result data before parsing and additional processing).

The various embodiments that are described herein are described with reference where appropriate to one or more of the various figures. An example computing environment with an application connector (e.g., as installed at a client device) configured to perform result batches processing functions (e.g., parallel fetching and parsing of result data) as well as an execution platform with a query processing manager (e.g., configured to generate query result information used by the application connector) are discussed in connection with FIGS. 1-3. Example configurations associated with the result batches processing functions of the application connector as well as functions of the query processing manager of the execution platform are discussed in association with FIGS. 4-8. A more detailed discussion of example computing devices that may be used with the disclosed techniques is provided in connection with FIG. 9.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., performing reverse ETL functions described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/ or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, the client device 114 is configured with an application connector 128 (e.g., a Python connector), which may be configured to perform result batches processing functions 130. Additional description of the application connector 128 and the result batches processing functions 130 is provided in connection with FIG. 4-FIG. 8.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

The execution platform 110 comprises a plurality of compute nodes. In some embodiments, one or more of the execution nodes of the execution platform 110 can be configured with a query processing manager 132 performing disclosed result data processing functionalities. More specifically, the query processing manager 132 is configured to perform query processing (e.g., using a query processor) and generate query result information (e.g., location information of query results, authentication information for accessing the query results, schema information associated with the query results, as well as other metadata information). The query result information may be used by the application connector 128 in connection with the result batches processing functions 130. A more detailed description of the query processing manager 132 and the functions it may perform are provided in connection with FIG. 5 and FIG. 6.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
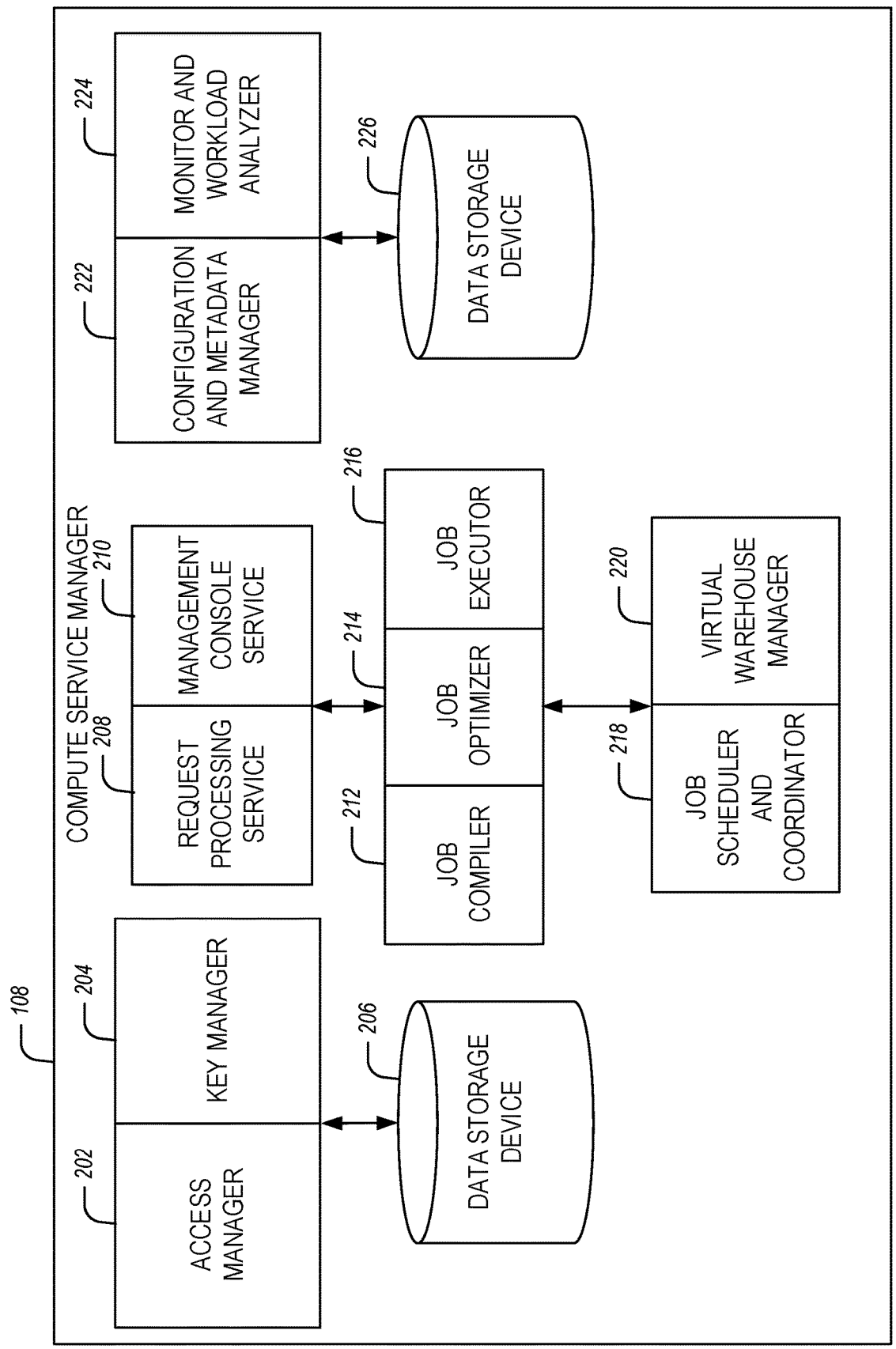
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
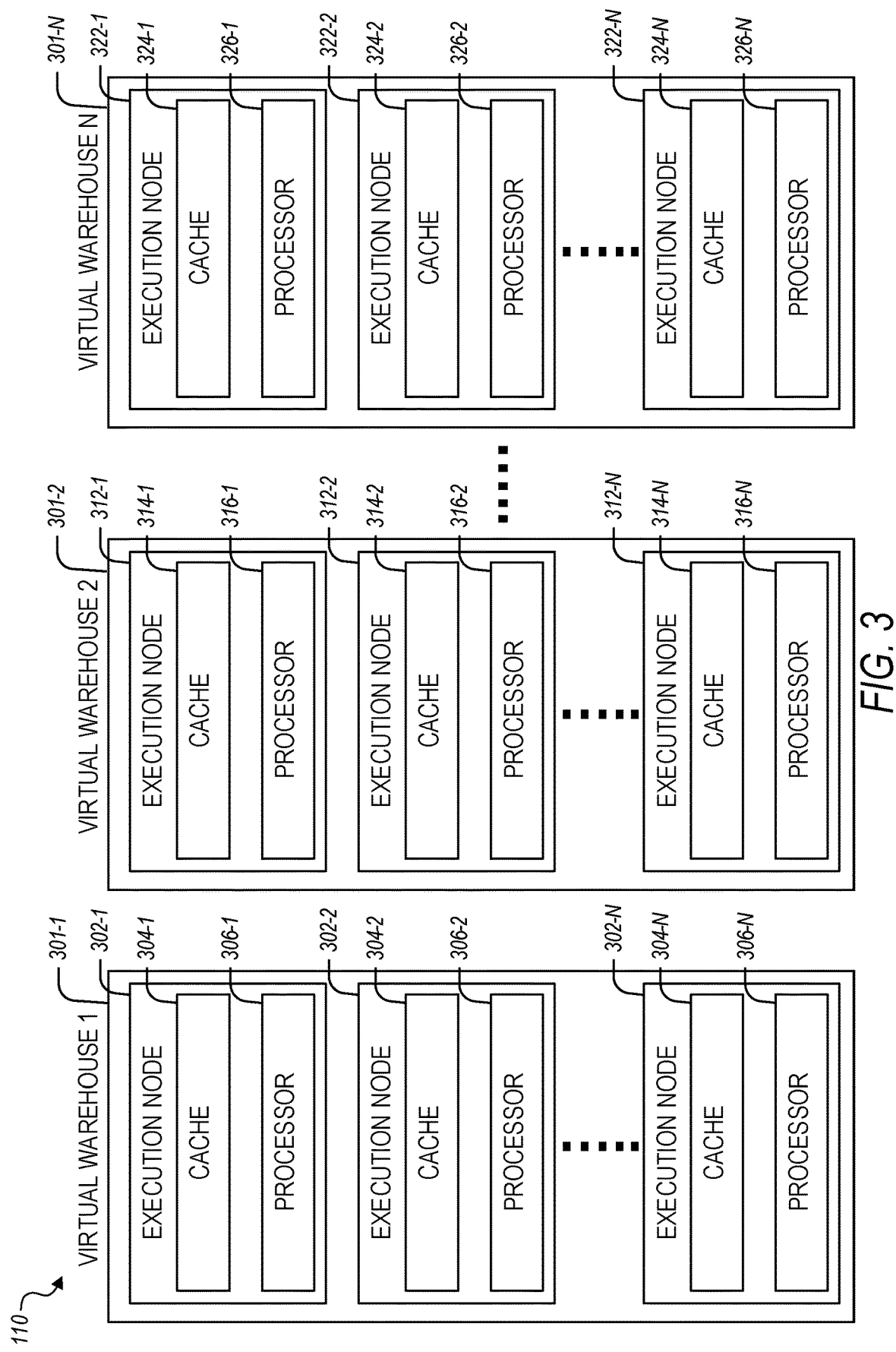
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 5:
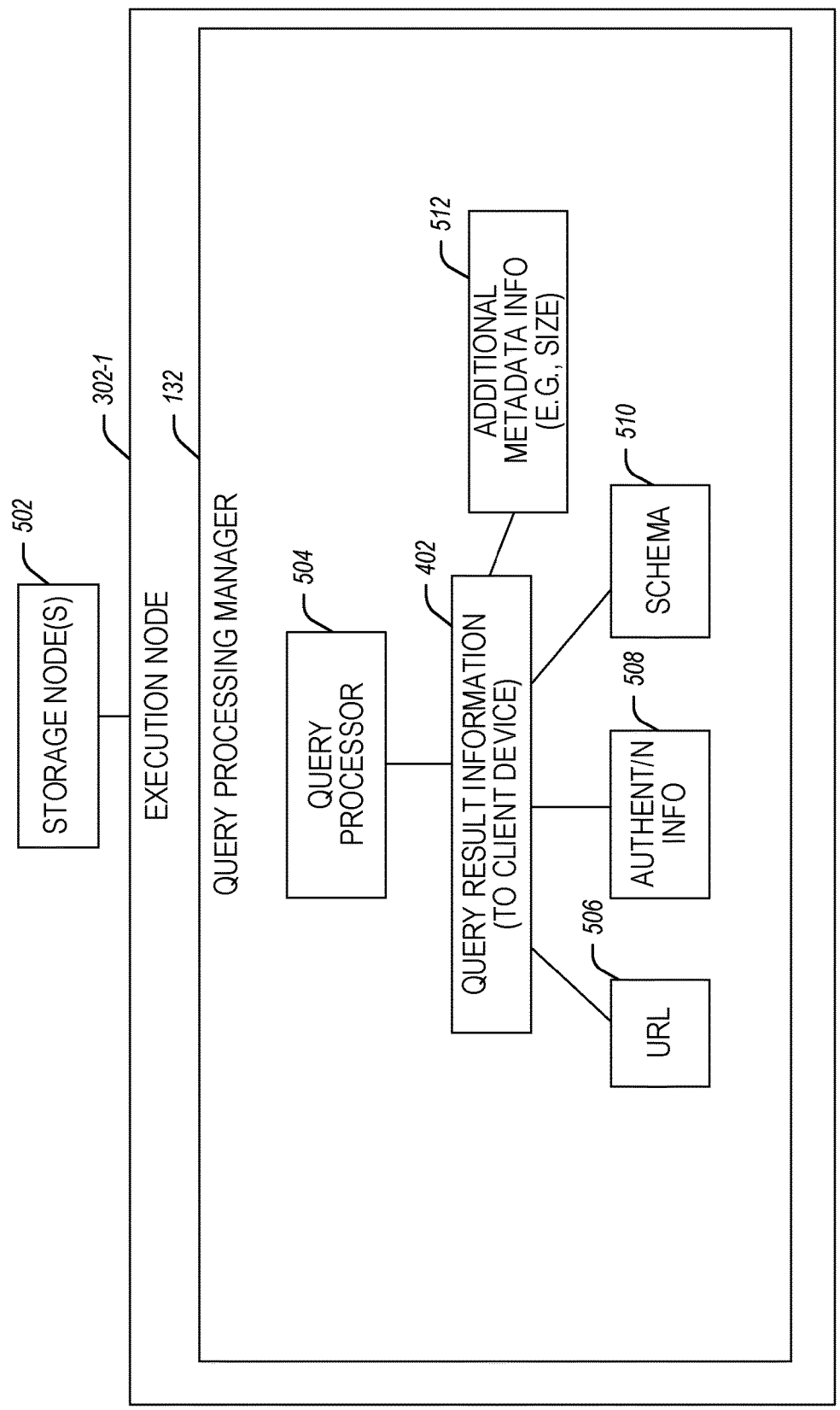
FIG. 5 is a diagram of an execution node configured with a query processing manager performing disclosed functionalities, in accordance with some embodiments of the present disclosure.

In some embodiments, at least one of the execution nodes of execution platform 110 (e.g., execution node 302-1) is configured with the query processing manager 132. For example, a more detailed description of execution node 302-1 configured with query processing manager 132 is provided in connection with FIG. 5. Additional query processing managers performing the disclosed result data processing functionalities may also be configured in other execution nodes of the execution platform 110. Even though FIG. 5 illustrates the query processing manager 132 configured as part of an execution node, the disclosure is not limited in this regard, and the query processing manager 132 may be configured as part of the compute service manager 108 or as part of a stand-alone node within the network-based database system 102.

Figure 4:
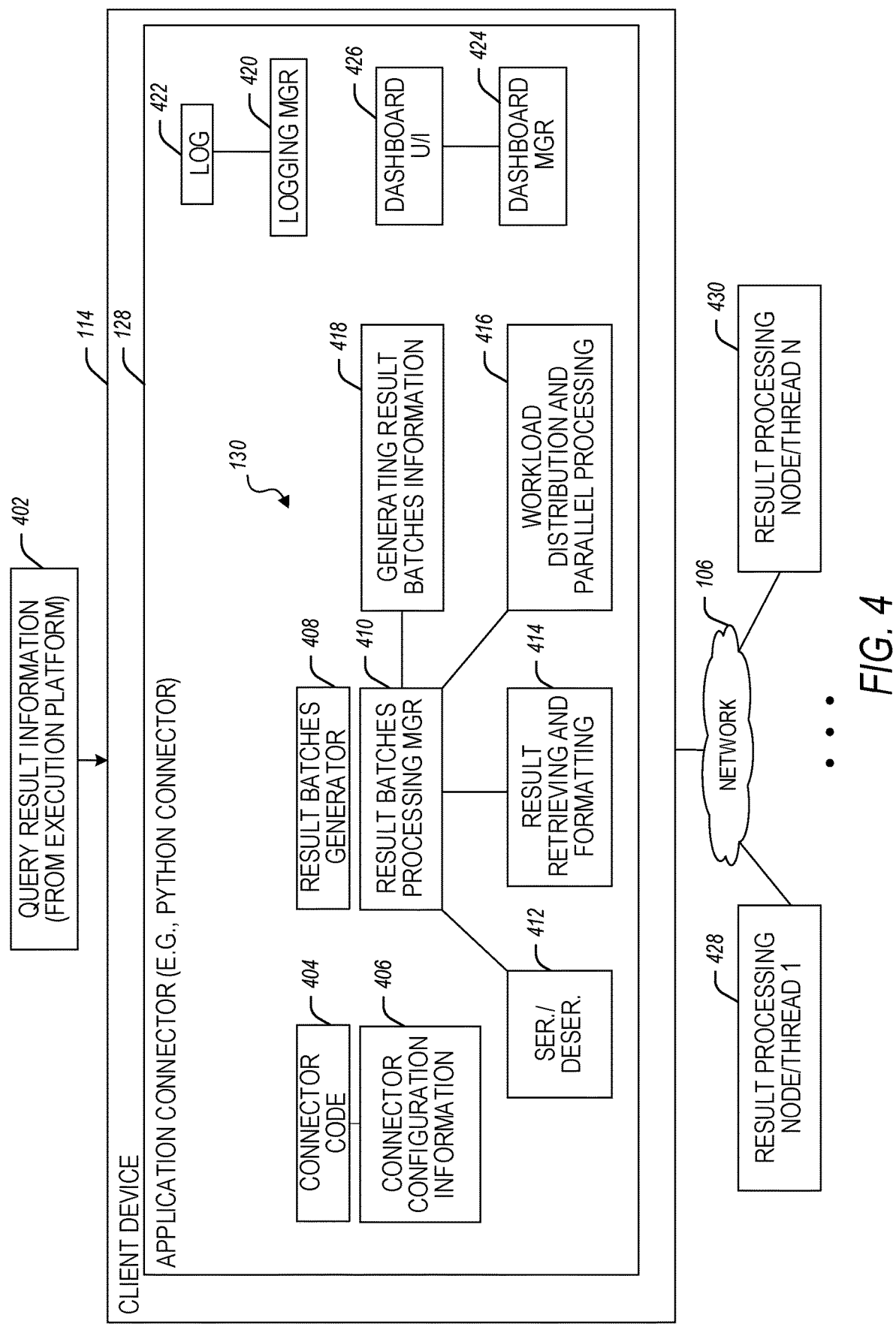
FIG. 4 is a diagram of a client device configured with an application connector performing disclosed functionalities, in accordance with some embodiments of the present disclosure.

FIG. 4 is a diagram of a client device configured with an application connector performing disclosed functionalities, in accordance with some embodiments of the present disclosure. For example, the client device 114 is configured with an application connector 128, which may be used for generalizing and writing data from a data warehouse (e.g., a storage device associated with the storage platform 104) as well as create or update application objects (e.g., one or more objects of a Software-as-a-Service (SaaS) application) using the data from the data warehouse. In some embodiments, the application connector 128 is a Python connector configured to provide an interface for developing Python applications to access functionalities of the network-based database system 102 and perform database-related functionalities.

In some embodiments, the application connector 128 is configured with a result batches generator 408 and a result batches processing manager 410 for performing the result batches processing functions 130 (such as functions 412, 414, 416, and 418 as discussed herein, including configuring and using result batches for result data processing including parallel fetching and parsing of result data).

In some embodiments, the application connector (also referred to as Python connector) 128 includes connector code 404 and connector configuration information 406. In some embodiments, the connector code 404 may be executed to trigger database-related functionalities such as user login, database and table creation, virtual warehouse creation, data insertion and loading, as well as querying and query result processing within the network-based database system 102. The connector configuration information 406 allows an end-user (e.g., a user of client device 114) to configure functionalities performed by the application connector 128.

Figure 6:
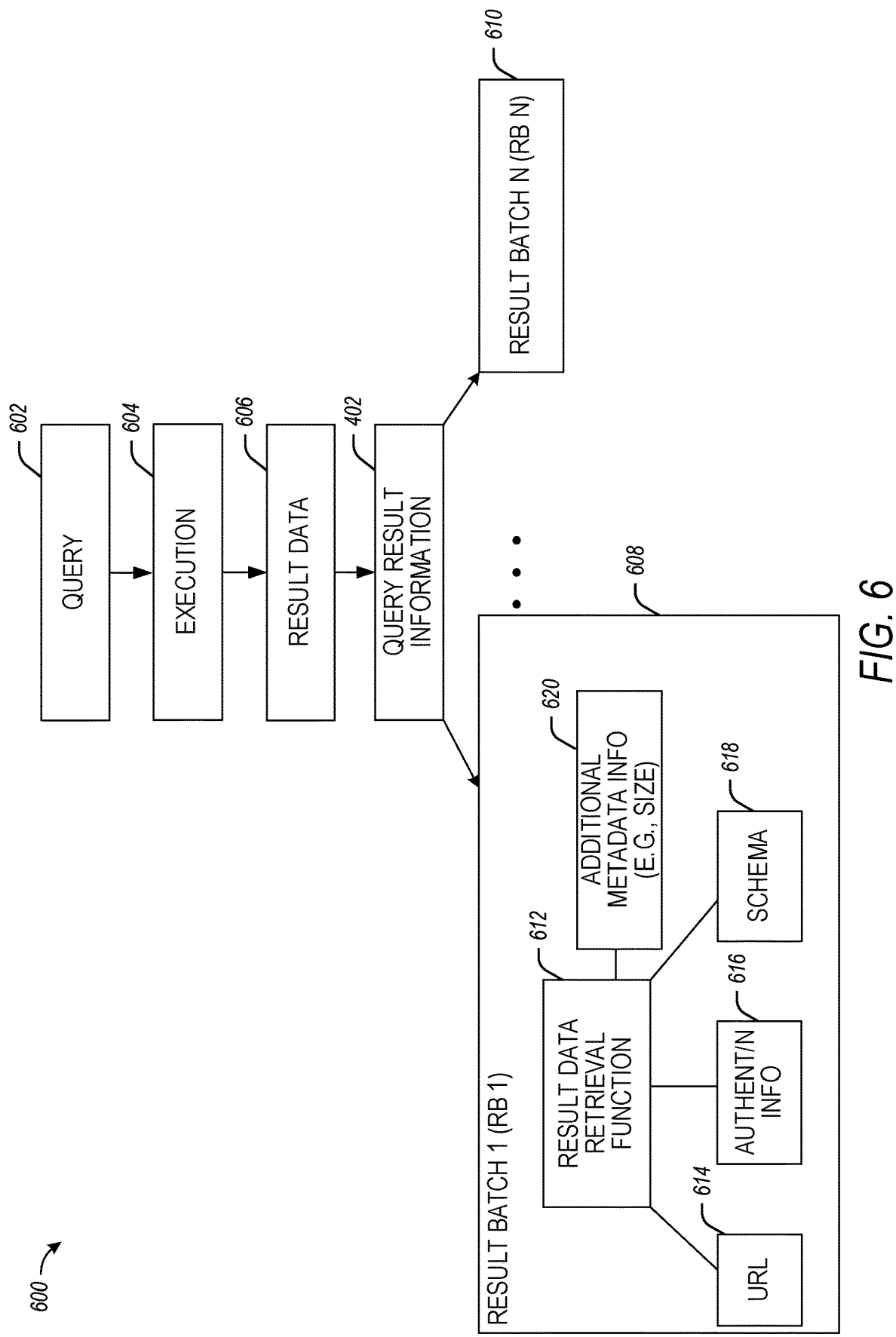
FIG. 6 is a block diagram of example result batches generated based on query execution, in accordance with some embodiments of the present disclosure.

In some embodiments, the application connector 128 further includes a result batches generator 408 and a result batches processing manager 410. The result batches generator 408 comprises suitable circuitry, logic, interfaces, and/or code and is configured to generate multiple result batches using query result information 402 (e.g., query result information obtained from the query processing manager 132 of the execution node 302-1). For example, the query processing manager 132 of the execution node 302-1 executes a query and result data from the query execution may be stored at a storage node (e.g., storage node 502 in FIG. 5). The result data is used to generate query result information 402, which includes location information of query results, authentication information for accessing the query results, schema information associated with the query results, as well as other metadata information (e.g., as illustrated in FIG. 5 and FIG. 6). The result batches generator 408 uses the query result information 402 to generate result batches (e.g., as illustrated in FIG. 6).

In some embodiments, the query results may include multiple subsets of query results, e.g., as generated at multiple intermediate stages of the query execution. In this regard, the result batches generator 408 may detect the generation of such subsets of query results and may generate a corresponding result batch for each subset. Example generation of multiple result batches is illustrated in FIG. 6.

The result batches processing manager 410 comprises suitable circuitry, logic, interfaces, and/or code and is configured to perform various processing functionalities associated with generated result batches. For example, the result batches processing manager 410 is configured to perform result batches processing functions 130, such as serialization/deserialization 412, result retrieving and formatting 414, workload distribution and parallel processing 416, and generating result batches information 418.

During serialization/deserialization 412, result batches can be downloaded and stored across multiple processing nodes (e.g., processing nodes 428, . . . , 430) for subsequent processing and to support distributed use cases.

During result retrieving and formatting 414, query result data from query execution may be retrieved using one or more result batches generated by the result batches generator 408. For example, a result data retrieval function in a result batch may include location information associated with stored result data (e.g., URL information), authentication information, schema information, and other metadata information as illustrated in FIG. 6. The location information may be used for fetching a query result subset (of the query result data) associated with the result batch for further processing. In an example embodiment, the retrieved result data may be formatted as a data table or a data object. In another example embodiment, a result batch may be fetched only when the query result data is requested (e.g., when a query result subset of a result batch is iterated over). In this regard, a single query result subset may be iterated over to fetch only the query result data associated with the corresponding result batch. Additional formatting options may also be configured using, e.g., the connector configuration information 406 of the application connector 128.

During workload distribution and parallel processing 416, result batches are serialized and distributed to different processing nodes (or threads) 428, . . . 430 (e.g., different processing threads executing on one or more processing nodes) where the result batches may be processed in parallel. In some aspects, different query result subsets can be iterated over in parallel, causing the corresponding result batches to also be processed in parallel so that the query result subsets are updated independently of each other. In some embodiments, the application connector 128 is configured at each of the processing nodes (or threads) 428, . . . , 430 to enable the workload distribution and parallel processing 416 at multiple nodes or threads.

In an example embodiment, the result batches processing manager 410 may be configured to enable or disable prefetching of query result subsets. For example, if prefetching is enabled, the query result subsets for the first X number of result batches can be automatically pre-fetched for processing (where X is a positive integer that can be preconfigured). If prefetching is disabled, workload distribution and parallel processing 416 of query result data may be performed using result batches generated by the result batches generator 408 (and without performing any prefetching).

During generating result batches information 418, the result batches processing manager 410 may generate additional information associated with result batches which may be used during workload distribution and parallel processing 416. For example, the additional information which can be made available by the application connector 128 includes a list of available result batches generated by the result batches generator 408 as well as specific information for each batch, such as row count, uncompressed size of the result batch, compressed size of the result batch, and the schema associated with the query result subset corresponding to the result batch.

In some embodiments, the application connector 128 (or other applications of the client device 114) is configured with a logging manager 420 and a dashboard manager 424. The logging manager 420 comprises suitable circuitry, interfaces, and/or code and is configured to maintain one or more logs (such as log 422). For example, the logging manager 420 may update log 422 with a list of generated result batches as well as execution status for each of the result batches (e.g., serialization/deserialization status, processing node or thread hosting the result batch, query result subset processing status including whether or not the result has been fetched, how many times the result has been fetched, etc.).

In some embodiments, the dashboard manager 424 comprises suitable circuitry, interfaces, and/or code and is configured to maintain one or more dashboards (such as dashboard user interface (U/I) 426). The dashboard U/I 426 may be used to configure settings of the connector configuration information 406 as well as settings associated with functionalities performed by the result batches generator 408 and the result batches processing manager 410.

FIG. 5 is a diagram of an execution node configured with a query processing manager performing disclosed functionalities, in accordance with some embodiments of the present disclosure. Referring to FIG. 5, the execution node 302-1 is configured with a query processing manager 132. The query processing manager 132 of the execution node 302-1 executes a query to generate query result data, which may be stored at a storage node (e.g., storage node 502). In some aspects, storage node 502 may be part of the external stage 124 (at the cloud-storage platform 122) or the internal stage 126 at the storage platform 104.

In an example embodiment, the query processor 504 is configured to execute a query (e.g., originating from client device 114) to generate query result data. The query processor 504 is further configured to generate query result information 402, which is communicated back to client device 114 (and used by the application connector 128 to perform result batches processing functions 130, including the functions performed by the result batches generator 408 and the result batches processing manager 410). In some aspects, the query result information 428 includes location information 506 (e.g., a URL to a storage location storing a query result subset), authentication information 508 for accessing the query result subset, schema information 510 associated with a portion of the query result data (e.g., the query result subset), and additional metadata information 512 (e.g., size of the query result subset or other metadata). The query result information is also illustrated and discussed in connection with FIG. 6.

FIG. 6 is a block diagram 600 of example result batches generated based on query execution, in accordance with some embodiments of the present disclosure. Referring to FIG. 6, query 602 is executed at operation 604 (e.g., by the query processor 504) to obtain query result data 606. The query processor 504 of the query processing manager 132 further generates query result information 402, which includes result data location information 614, authentication information 616, schema information 618, and additional metadata information 620 (which are discussed in greater detail herein below).

After the query result information 402 is communicated to the application connector 128 at the client device 114, the result batches generator 408 generates result batches 608, . . . , 610 corresponding to query result data 606. More specifically, query result subsets of the query result data 606 may become available at different stages of the query execution at operation 604, and corresponding result batches 608, . . . , 610 are generated based on the query result subsets (e.g., a single result batch is generated to correspond to a single query result subset of the query result data 606).

As mentioned hereinabove, result batches include a result data retrieval function used for retrieving and processing the corresponding query result subset. For example, result batch 608 includes a result data retrieval function 612. The result data retrieval function 612 includes the query result information 402, namely, result data location information 614 (e.g., a URL to a storage location that stores the query result subset), authentication information 616 (e.g., secure key information or other authentication/authorization information used for accessing the query result subset at the identified location), schema information 618, and additional metadata information 620 (e.g., size of the query result subset for the corresponding result batch). The schema information 618 may include a schema associated with the result data 606 (or the corresponding query result subset associated with the result batch) which may be used to parse or perform additional processing of the retrieved query result subset.

In an example embodiment, a list of the result batches is generated as part of the generating result batches information 418 performed by the result batches processing manager 410. The list of result batches may be used subsequently to determine (e.g., based on user input or preconfigured setting) how many (or which) result batches from the list can be serialized and transferred to one or more processing nodes or threads to enable workload distribution and parallel processing 416.

Figure 7:
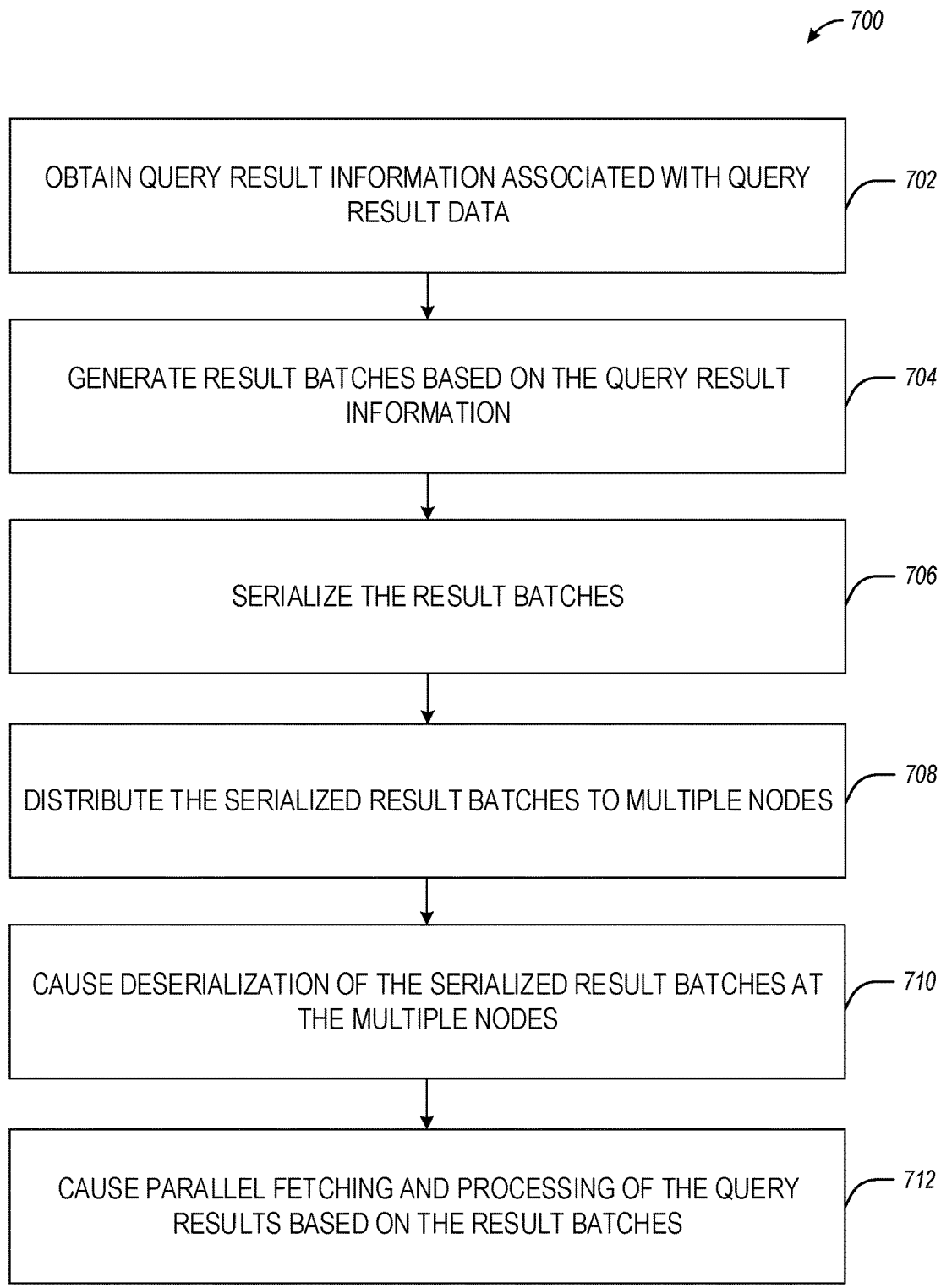
FIG. 7 is a flow diagram illustrating operations of a database system in performing a method for parallel fetching and processing of query results based on serialization and deserialization of result batches, in accordance with some embodiments of the present disclosure.

FIG. 7 is a flow diagram illustrating operations of a database system in performing a method 600 for parallel fetching and processing of query results based on serialization and deserialization of result batches, in accordance with some embodiments of the present disclosure. Method 700 may be embodied in computer-readable instructions for execution by one or more hardware components (e.g., one or more processors) such that the operations of the method 700 may be performed by a network node or another computing device (e.g., client device 114) which may be implemented as machine 800 of FIG. 8 and may be configured with an application connector performing the disclosed functionalities. Accordingly, method 700 is described below, by way of example with reference thereto. However, it shall be appreciated that method 700 may be deployed on various other hardware configurations and is not intended to be limited to deployment within a client device 114 of the network-based database system 102.

Referring to FIG. 7, at operation 702, the application connector 128 may obtain query result information 402 associated with query result data (e.g., query result data 606). At operation 704, the result batches generator 408 of the application connector 128 generates result batches (e.g., result batches 608, . . . , 610) based on the query result data. At operation 706, the generated result batches are serialized (e.g., by the result batches processing manager 410 of the application connector 128). At operation 708, the serialized result batches are distributed to one or more processing nodes (or threads executing on the one or more processing nodes) for subsequent processing (e.g., to enable workload distribution and parallel processing 416). At operation 710, the result batches processing manager 410 (or another function of the application connector 128) triggers data serialization of the serialized result batches at the corresponding nodes or threads. Alternatively, deserialization may be triggered by a query processing manager (similar in functionality to the query processing manager 128 at execution node 302-1) at each processing node that has received a serialized result batch. At operation 712, parallel fetching and processing of the query result subsets are triggered based on the result batches. In some aspects, the parallel fetching and processing of the query result subsets are triggered by the result batches processing manager 410 of the application connector 128 or by one or more other application connectors at each processing node that has received a serialized result batch.

Figure 8:
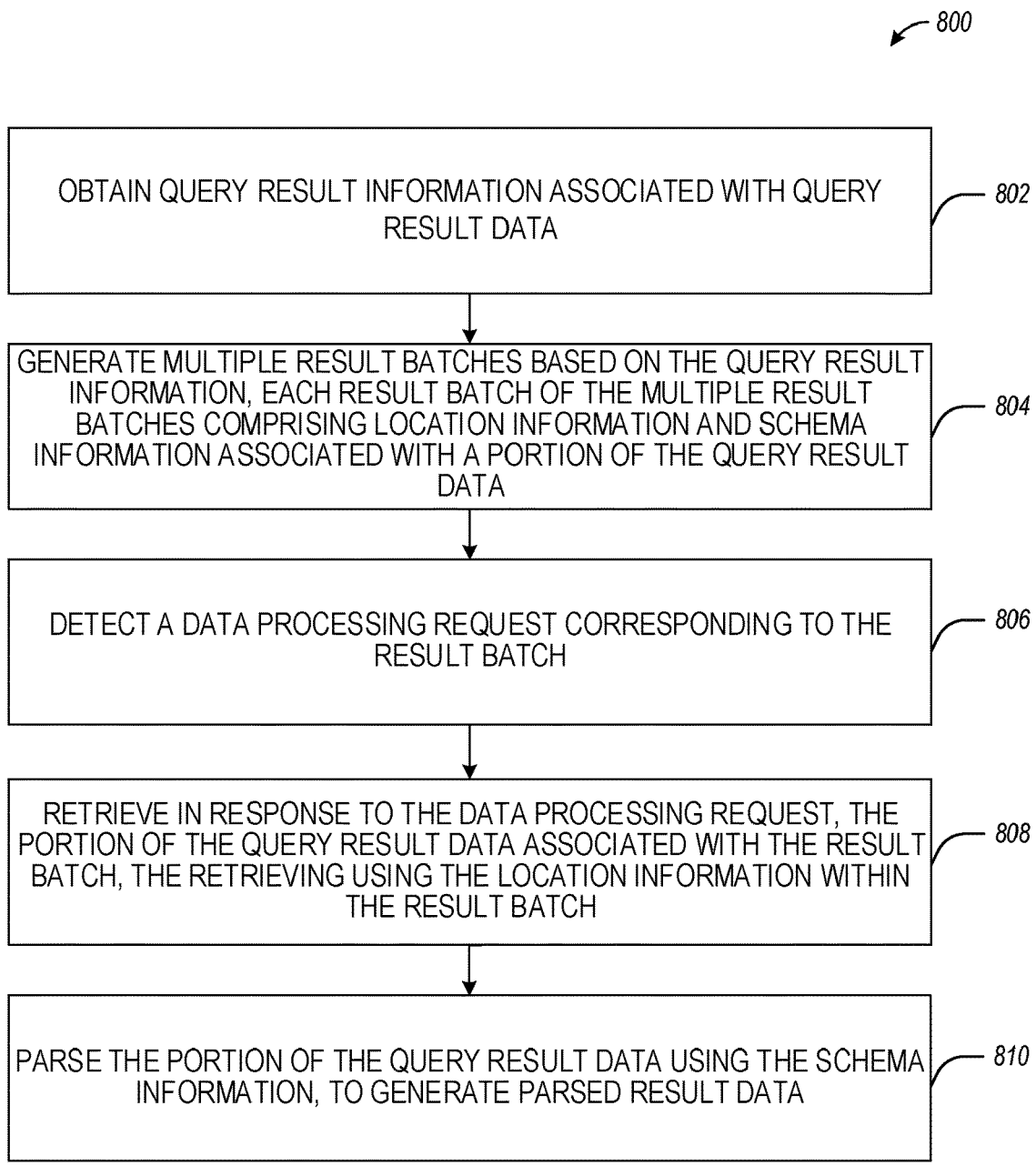
FIG. 8 is a flow diagram illustrating operations of a database system in performing a method for processing query results using result batches, in accordance with some embodiments of the present disclosure.

FIG. 8 is a flow diagram illustrating operations of a database system in performing a method 800 for processing of query results using result batches, in accordance with some embodiments of the present disclosure. Method 800 may be embodied in computer-readable instructions for execution by one or more hardware components (e.g., one or more processors) such that the operations of the method 800 may be performed by components of network-based database system 102, such as a network node or computing device (e.g., client device 114) which may be implemented as machine 800 of FIG. 8 and may be configured with an application connector performing the disclosed functions. Accordingly, method 800 is described below, by way of example with reference thereto. However, it shall be appreciated that method 800 may be deployed on various other hardware configurations and is not intended to be limited to deployment within the network-based database system 102.

At operation 802, query result information is obtained, where the query result information is associated with query result data generated from a query execution. For example, the application connector 128 obtains query result information 402 from the query processing manager 132 of the execution node 302-1.

At operation 804, multiple result batches are generated based on the query result information. For example, the result batches processing manager 410 generates multiple result batches 608, . . . , 610 based on the query result information 402. Each result batch of the multiple result batches 608, . . . , 610 includes location information (e.g., location information 614 which may include a URL to a storage location storing a query result subset) and schema information (e.g., schema information 618) associated with a portion of the query result data (e.g., the query result subset associated with the result batch 608).

At operation 806, a data processing request corresponding to the result batch is detected. For example, the application connector 128 executing the result batches processing manager 410 may detect an iteration (or request) associated with the query result data.

At operation 808, the portion of the query result data associated with the result batch is retrieved in response to the data processing request. For example, the retrieving of the query result data is based on the location information within the result batch.

At operation 710, the retrieved portion of the query result data is parsed using the schema information to generate parsed result data.

Figure 9:
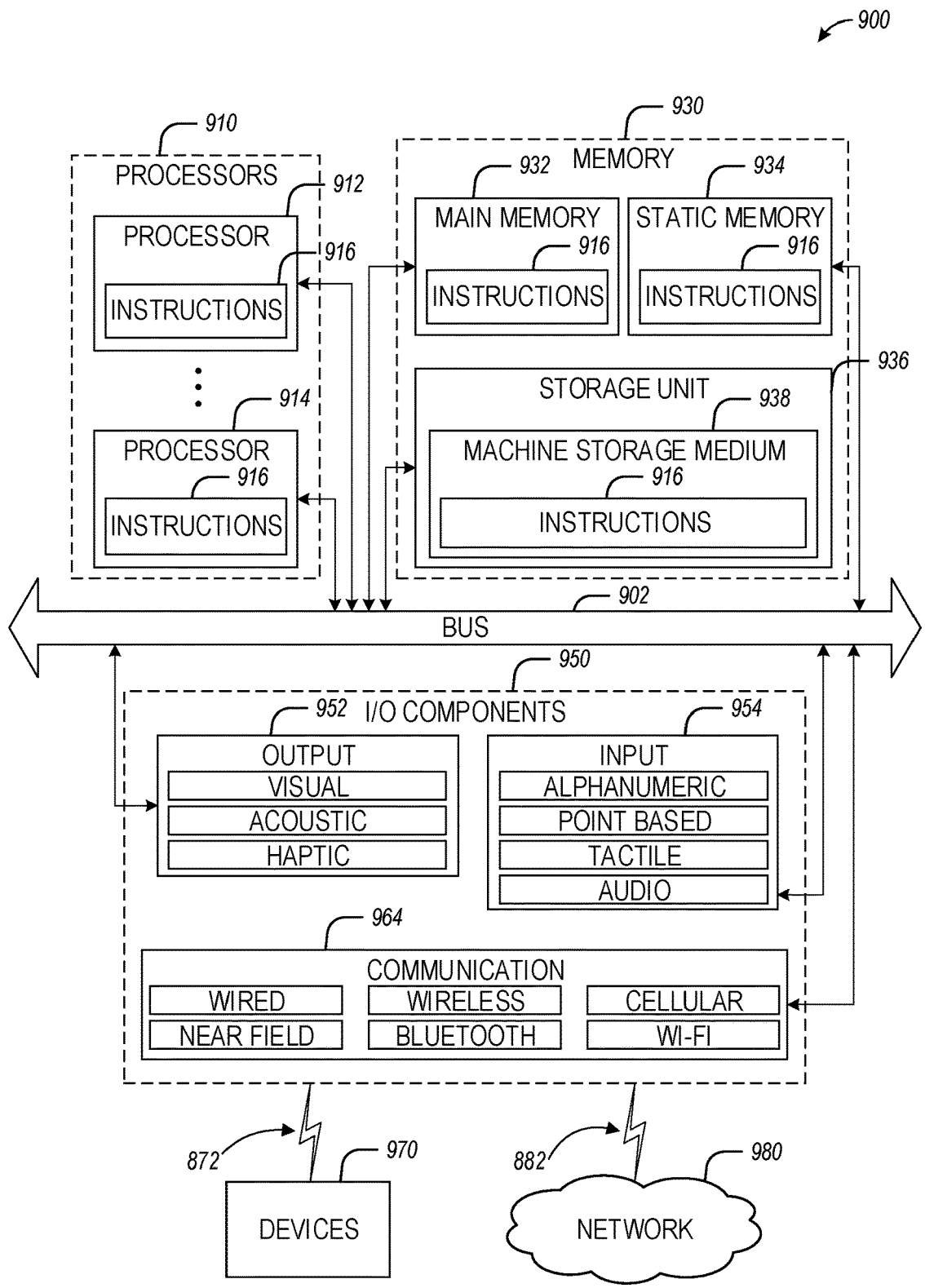
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 800 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, instructions 916 may cause machine 900 to execute any one or more operations of methods 600, 700, and 800 (or any other technique discussed herein, for example in connection with FIG. 4-FIG. 8). As another example, instructions 916 may cause machine 900 to implement one or more portions of the functionalities discussed herein. In this way, instructions 916 may transform a general, non-programmed machine into a particular machine 900 (e.g., the client device 114, the compute service manager 108, or a node in the execution platform 110) that is specially configured to carry out any one of the described and illustrated functions in the manner described herein. In yet another embodiment, instructions 916 may configure the client device 114, the compute service manager 108, and/or a node in the execution platform 110 to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

Machine 900 includes processors 910, memory 930, and input/output (I/O) components 950 configured to communicate with each other such as via a bus 902. In some example embodiments, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within machine storage medium 938 of the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The device 970 may be another machine or any of a wide variety of peripheral devices (e.g., a peripheral device coupled via a universal serial bus (USB)). For example, as noted above, machine 900 may correspond to any one of the client device 114, the compute service manager 108, or the execution platform 110, and the devices 970 may include the client device 114 or any other computing device described herein as being in communication with the network-based database system 102 or the cloud storage platform 104.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of several well-known transfer protocols (e.g., hypertext transfer protocol (HTTP)). Similarly, instructions 916 may be transmitted or received using a transmission medium via the coupling 972 (e.g., a peer-to-peer coupling or another type of wired or wireless network coupling) to the device 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of methods 600, 700, and 800 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: obtaining query result information associated with query result data generated from execution of a query, the query result information including location information and schema information associated with the query result data; generating multiple result batches based on the query result information, each result batch of the multiple result batches comprising the location information and the schema information associated with a portion of the query result data; retrieving in response to the data processing request, the portion of the query result data associated with the result batch, the retrieving using the location information within the result batch; and parsing the portion of the query result data using the schema information, to generate parsed result data.

In Example 2, the subject matter of Example 1 includes subject matter where the instructions further cause the at least one hardware processor to perform operations comprising: distributing the multiple result batches to a plurality of nodes; and causing parallel fetching and processing of corresponding portions of the query result data at the plurality of nodes using the multiple result batches.

In Example 3, the subject matter of Example 2 includes subject matter where each node of the plurality of nodes receives at least one result batch of the multiple result batches during the distributing.

In Example 4, the subject matter of Examples 2-3 includes subject matter where the instructions further cause the at least one hardware processor to perform operations comprising: serializing the multiple result batches before the distributing; and causing deserialization of the serialized multiple result batches at the plurality of nodes before the parallel fetching and processing.

In Example 5, the subject matter of Examples 1~4 includes subject matter where the location information is a uniform resource locator (URL) associated with a storage location storing the portion of the query result data.

In Example 6, the subject matter of Examples 1-5 includes subject matter where each result batch of the multiple result batches further comprises authentication information associated with the portion of the query result data, and where the authentication information is included in the query result information.

In Example 7, the subject matter of Example 6 includes subject matter where the instructions further cause the at least one hardware processor to perform operations comprising: retrieving the portion of the query result data associated with the result batch based on the authentication information.

In Example 8, the subject matter of Examples 1-7 includes subject matter where the instructions further cause the at least one hardware processor to perform operations comprising: converting the portion of the query result data associated with the result batch into a data table or a data object; and providing the data table or the data object as output, in response to the data processing request.

In Example 9, the subject matter of Examples 1-8 includes subject matter where the instructions further cause the at least one hardware processor to perform operations comprising: distributing the multiple result batches to a plurality of processing threads executing on one or more nodes; and causing parallel fetching and processing of corresponding portions of the query result data by the plurality of processing threads, using the multiple result batches.

Example 10 is a method comprising: obtaining query result information associated with query result data generated from execution of a query, the query result information including location information and schema information associated with the query result data; generating multiple result batches based on the query result information, each result batch of the multiple result batches comprising the location information and the schema information associated with a portion of the query result data; detecting a data processing request corresponding to the result batch; retrieving in response to the data processing request, the portion of the query result data associated with the result batch, the retrieving using the location information within the result batch; and parsing the portion of the query result data using the schema information, to generate parsed result data.

In Example 11, the subject matter of Example 10 includes, distributing the multiple result batches to a plurality of nodes; and causing parallel fetching and processing of corresponding portions of the query result data at the plurality of nodes using the multiple result batches.

In Example 12, the subject matter of Example 11 includes subject matter where each node of the plurality of nodes receives at least one result batch of the multiple result batches during the distributing.

In Example 13, the subject matter of Examples 11-12 includes, serializing the multiple result batches before the distributing; and causing deserialization of the serialized multiple result batches at the plurality of nodes before the parallel fetching and processing.

In Example 14, the subject matter of Examples 10-13 includes subject matter where the location information is a uniform resource locator (URL) associated with a storage location storing the portion of the query result data.

In Example 15, the subject matter of Examples 10-14 includes subject matter where each result batch of the multiple result batches further comprises authentication information associated with the portion of the query result data, and where the authentication information is included in the query result information.

In Example 16, the subject matter of Example 15 includes, retrieving the portion of the query result data associated with the result batch based on the authentication information.

In Example 17, the subject matter of Examples 10-16 includes, converting the portion of the query result data associated with the result batch into a data table or a data object; and providing the data table or the data object as output, in response to the data processing request.

In Example 18, the subject matter of Examples 10-17 includes, distributing the multiple result batches to a plurality of processing threads executing on one or more nodes; and causing parallel fetching and processing of corresponding portions of the query result data by the plurality of processing threads, using the multiple result batches.

Example 19 is a computer-readable medium comprising instructions that, when executed by one or more processors of a machine, configure the machine to perform operations comprising: obtaining query result information associated with query result data generated from execution of a query, the query result information including location information and schema information associated with the query result data; generating multiple result batches based on the query result information, each result batch of the multiple result batches comprising the location information and the schema information associated with a portion of the query result data; detecting a data processing request corresponding to the result batch; retrieving in response to the data processing request, the portion of the query result data associated with the result batch, the retrieving using the location information within the result batch; and parsing the portion of the query result data using the schema information, to generate parsed result data.

In Example 20, the subject matter of Example 19 includes, the operations further comprising: distributing the multiple result batches to a plurality of nodes; and causing parallel fetching and processing of corresponding portions of the query result data at the plurality of nodes using the multiple result batches.

In Example 21, the subject matter of Example 20 includes subject matter where each node of the plurality of nodes receives at least one result batch of the multiple result batches during the distributing.

In Example 22, the subject matter of Examples 20-21 includes, the operations further comprising: serializing the multiple result batches before the distributing; and causing deserialization of the serialized multiple result batches at the plurality of nodes before the parallel fetching and processing.

In Example 23, the subject matter of Examples 19-22 includes subject matter where the location information is a uniform resource locator (URL) associated with a storage location storing the portion of the query result data.

In Example 24, the subject matter of Examples 19-23 includes subject matter where each result batch of the multiple result batches further comprises authentication information associated with the portion of the query result data, and where the authentication information is included in the query result information.

In Example 25, the subject matter of Example 24 includes, the operations further comprising: retrieving the portion of the query result data associated with the result batch based on the authentication information.

In Example 26, the subject matter of Examples 19-25 includes, the operations further comprising: converting the portion of the query result data associated with the result batch into a data table or a data object; and providing the data table or the data object as output, in response to the data processing request.

In Example 27, the subject matter of Examples 19-26 includes, the operations further comprising: distributing the multiple result batches to a plurality of processing threads executing on one or more nodes; and causing parallel fetching and processing of corresponding portions of the query result data by the plurality of processing threads, using the multiple result batches.

Example 28 is at least one machine-readable medium including instructions that, when executed by processing circuitry, cause the processing circuitry to perform operations to implement any of Examples 1-27.

Example 29 is an apparatus comprising means to implement any of Examples 1-27.

Example 30 is a system to implement any of Examples 1-27.

Example 31 is a method to implement any of Examples 1-27.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   obtaining query result information associated with query result data generated from execution of a query, the query result information including location information and schema information associated with the query result data;
   generating multiple result batches based on the query result information, each result batch of the multiple result batches comprising the location information and the schema information associated with a portion of a plurality of portions of the query result data, the plurality of portions being available at different stages of the execution of the query;
   detecting a data processing request corresponding to the result batch;
   retrieving in response to the data processing request, the portion of the query result data associated with the result batch, the retrieving using the location information within the result batch; and
   parsing the portion of the query result data using the schema information, to generate parsed result data.

2. The system of claim 1, wherein the instructions further cause the at least one hardware processor to perform operations comprising:
   distributing the multiple result batches to a plurality of nodes; and
   causing parallel fetching and processing of corresponding portions of the query result data at the plurality of nodes using the multiple result batches.

3. The system of claim 2, wherein each node of the plurality of nodes receives at least one result batch of the multiple result batches during the distributing.

4. The system of claim 2, wherein the instructions further cause the at least one hardware processor to perform operations comprising:
   serializing the multiple result batches before the distributing; and
   causing deserialization of the serialized multiple result batches at the plurality of nodes before the parallel fetching and processing.

5. The system of claim 1, wherein the location information is a uniform resource locator (URL) associated with a storage location storing the portion of the query result data.

6. The system of claim 1, wherein each result batch of the multiple result batches further comprises authentication information associated with the portion of the query result data, and wherein the authentication information is included in the query result information.

7. The system of claim 6, wherein the instructions further cause the at least one hardware processor to perform operations comprising:
retrieving the portion of the query result data associated with the result batch based on the authentication information.

8. The system of claim 1, wherein the instructions further cause the at least one hardware processor to perform operations comprising:
converting the portion of the query result data associated with the result batch into a data table or a data object; and
providing the data table or the data object as output, in response to the data processing request.

9. The system of claim 1, wherein the instructions further cause the at least one hardware processor to perform operations comprising:
distributing the multiple result batches to a plurality of processing threads executing on one or more nodes; and
causing parallel fetching and processing of corresponding portions of the query result data by the plurality of processing threads, using the multiple result batches.

10. A method comprising:
obtaining query result information associated with query result data generated from execution of a query, the query result information including location information and schema information associated with the query result data;
generating multiple result batches based on the query result information, each result batch of the multiple result batches comprising the location information and the schema information associated with a portion of a plurality of portions of the query result data, the plurality of portions being available at different stages of the execution of the query;
detecting a data processing request corresponding to the result batch;
retrieving in response to the data processing request, the portion of the query result data associated with the result batch, the retrieving using the location information within the result batch; and
parsing the portion of the query result data using the schema information, to generate parsed result data.

11. The method of claim 10, further comprising:
distributing the multiple result batches to a plurality of nodes; and
causing parallel fetching and processing of corresponding portions of the query result data at the plurality of nodes using the multiple result batches.

12. The method of claim 11, wherein each node of the plurality of nodes receives at least one result batch of the multiple result batches during the distributing.

13. The method of claim 11, further comprising:
serializing the multiple result batches before the distributing; and
causing deserialization of the serialized multiple result batches at the plurality of nodes before the parallel fetching and processing.

14. The method of claim 10, wherein the location information is a uniform resource locator (URL) associated with a storage location storing the portion of the query result data.

15. The method of claim 10, wherein each result batch of the multiple result batches further comprises authentication information associated with the portion of the query result data, and wherein the authentication information is included in the query result information.

16. The method of claim 15, further comprising:
retrieving the portion of the query result data associated with the result batch based on the authentication information.

17. The method of claim 10, further comprising:
converting the portion of the query result data associated with the result batch into a data table or a data object; and
providing the data table or the data object as output, in response to the data processing request.

18. The method of claim 10, further comprising:
distributing the multiple result batches to a plurality of processing threads executing on one or more nodes; and
causing parallel fetching and processing of corresponding portions of the query result data by the plurality of processing threads, using the multiple result batches.

19. A computer-readable medium comprising instructions that, when executed by one or more processors of a machine, configure the machine to perform operations comprising:
obtaining query result information associated with query result data generated from execution of a query, the query result information including location information and schema information associated with the query result data;
generating multiple result batches based on the query result information, each result batch of the multiple result batches comprising the location information and the schema information associated with a portion of a plurality of portions of the query result data, the plurality of portions being available at different stages of the execution of the query;
detecting a data processing request corresponding to the result batch;
retrieving in response to the data processing request, the portion of the query result data associated with the result batch, the retrieving using the location information within the result batch; and
parsing the portion of the query result data using the schema information, to generate parsed result data.

20. The computer-readable medium of claim 19, the operations further comprising:
distributing the multiple result batches to a plurality of nodes; and
causing parallel fetching and processing of corresponding portions of the query result data at the plurality of nodes using the multiple result batches.

21. The computer-readable medium of claim 20, wherein each node of the plurality of nodes receives at least one result batch of the multiple result batches during the distributing.

22. The computer-readable medium of claim 20, the operations further comprising:
serializing the multiple result batches before the distributing; and
causing deserialization of the serialized multiple result batches at the plurality of nodes before the parallel fetching and processing.

23. The computer-readable medium of claim 19, wherein the location information is a uniform resource locator (URL) associated with a storage location storing the portion of the query result data.

24. The computer-readable medium of claim 19, wherein each result batch of the multiple result batches further comprises authentication information associated with the portion of the query result data, and wherein the authentication information is included in the query result information.

25. The computer-readable medium of claim 24, the operations further comprising:
retrieving the portion of the query result data associated with the result batch based on the authentication information.

26. The computer-readable medium of claim 19, the operations further comprising:
converting the portion of the query result data associated with the result batch into a data table or a data object; and
providing the data table or the data object as output, in response to the data processing request.

27. The computer-readable medium of claim 19, the operations further comprising:
distributing the multiple result batches to a plurality of processing threads executing on one or more nodes; and
causing parallel fetching and processing of corresponding portions of the query result data by the plurality of processing threads, using the multiple result batches.

* * * * *